Feb. 23, 1960

S. N. ZARRILLO 2,926,033

HUB COUPLING FOR ELECTRICAL CONTROLS

Filed Sept. 19, 1955

INVENTOR
Salvatore N. Zarrillo
BY Kane, Dalsimer and Kane
ATTORNEYS

Feb. 23, 1960 S. N. ZARRILLO 2,926,033
HUB COUPLING FOR ELECTRICAL CONTROLS
Filed Sept. 19, 1955 2 Sheets-Sheet 2
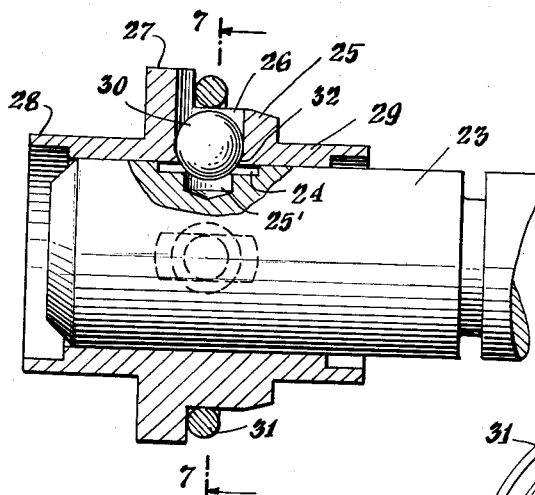
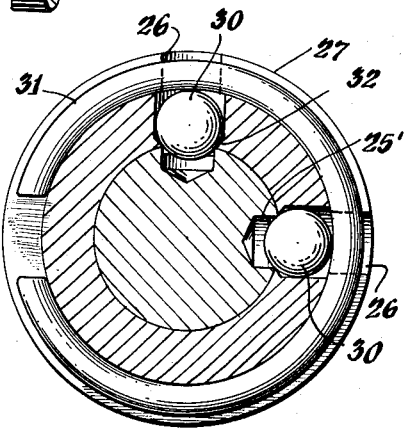
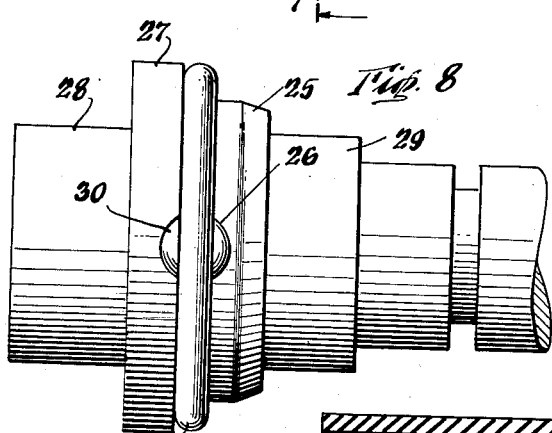
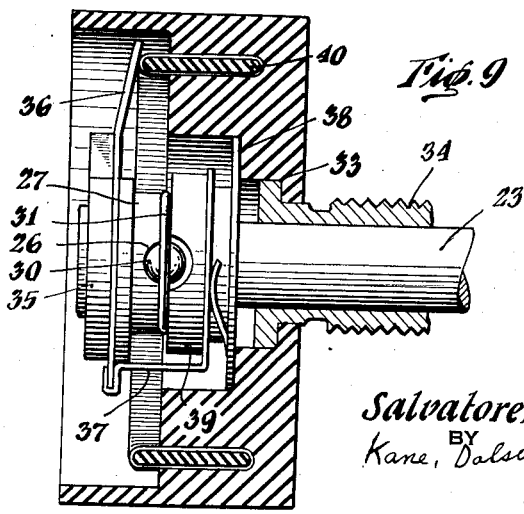
INVENTOR
Salvatore N. Zarrillo
BY
Kane, Dalsimer and Kane
ATTORNEYS

United States Patent Office 2,926,033
Patented Feb. 23, 1960

2,926,033

HUB COUPLING FOR ELECTRICAL CONTROLS

Salvatore N. Zarrillo, Salmon Falls, N.H., assignor to Clarostat Mfg. Company, Inc., Dover, N.H., a corporation of New York Application September 19, 1955, Serial No. 535,157

1 Claim. (Cl. 287—52.05)

This invention relates to a structurally and functionally improved coupling for the ready attachment and detachment of a hub assembly with the shaft of an electrical control such as a potentiometer.

It is a primary object of the invention to furnish a coupling structure which preferably will not require use of any tools in that its parts may readily be manipulated by the hand of an operator and moreover which will not require the use of skilled employees to secure its parts together or to detach them.

A further object of the invention is that of designing a coupling which, as the hub is applied to or removed from the shaft, will not scar or mar the latter. Moreover, the coupling when operative will maintain the relationship of the hub and shaft both radially and axially without lost motion even under conditions of vibration.

Still another object is that of furnishing a structure of this nature which will permit of the application to and removal from the shaft of a hub assembly even when that shaft extends into the casing. Accordingly, the hub may be renewed when necessary without requiring a dismounting of an entire assembly of apparatus, interruption of circuit, etc. Also, it becomes feasible to mount and connect a control and only thereafter to apply the hub and its associated parts to the shaft.

A still further object is that of providing structures which may be manufactured by quantity production methods and with maximum economy; such structures embodying relatively few and rugged parts capable of ready assembly and, when so assembled, furnishing a control which may be used for long periods of time with freedom from all difficulties.

With these and other objects in mind, reference is had to the attached sheets of drawings illustrating practical embodiments of the invention, and in which:

Fig. 6 is a sectional side view of a second form of coupling and with the shaft broken away;

Fig. 7 is a transverse sectional view taken along the line 7—7 in the direction of the arrows as indicated in Fig. 6;

Fig. 8 is a side elevation of the coupling as shown in these figures; and

Fig. 9 is a fragmentary sectional side view of a control embodying the coupling of Figs. 6 to 8.

Figure 1:
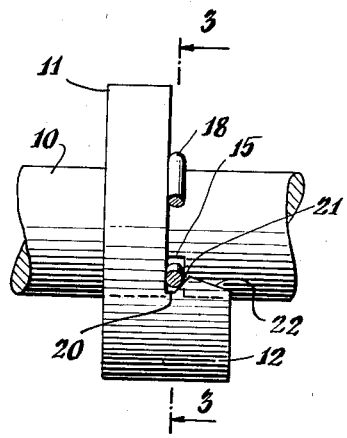
Fig. 1 is a fragmentary side elevation of a shaft with a hub mounted thereon.
Figure 2:
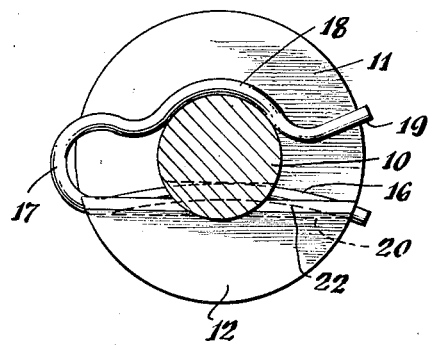
Fig. 2 is a transverse sectional view through the shaft and an end view of the parts as shown in Fig. 1.

Referring primarily to Figs. 1 to 5, the numeral 10 indicates an operating shaft, and 11 a hub to be secured against movement with respect to that shaft. These elements are embodied in an electrical control assembly shown generally in Fig. 9, hereinafter described. That assembly may involve, for example, a potentiometer. In accordance with conventional construction, the shaft 10 will be supported for rotation by the bushing of the control and will have attached to it an operating knob or other element whereby it may readily be turned. The hub will—as shown—ordinarily be circular and formed of metal. It will conveniently embrace part of an assembly mounting a contact arm or arms to traverse a resistance and/or a contact ring as the shaft is rotated. Having in mind that the present invention primarily relates to the locking or securing means for retaining the hub in association with the shaft, the remainder of the assembly has not been shown in this initial group of figures.

The hub 11 as illustrated embraces generally a disc shape throughout a zone of which an abutment portion 12 projects in a lateral direction. That portion, as especially shown in Fig. 5, may extend throughout a substantial arcuate segment of the disc (for example, around 100°). The bore 13 of the body 11 is continued throughout portion 12 in the form of a groove 14. These surfaces should have a close tolerance with the shaft 10 so that when the latter is extended through the opening 13, to also project within the groove 14, a minimum of play will exist between the parts.

At the zone of the shaft where the hub is to be mounted the former is provided with a grove or slot 15. This slot should penetrate the shaft body to an extent not more than one-third of its diameter and the base of the slot should be preferably flat. This slot receives a retaining or detent member in the form of a clip, one arm 16 of which is bowed throughout its entire length. That arm is coupled by a connecting portion 17 with a second arm, which includes a centrally bowed portion 18 having a radius substantially equal to that of the surface of shaft 10. This arm conveniently terminates in an outwardly extending end portion 19. It will be appreciated that the clip or pin thus provided is perferably formed of resilient stock.

A transverse groove or slot presenting a substantially U-shaped base 20 is formed within abutment 12 and adjacent hub 11 and is defined by opposed walls of the hub body and abutment portion. As shown, this groove extends transversely of the hub axis and beyond the middle of the shaft-receiving bore 13. The outer side face of the groove is defined by a surface 21 inclined outwardly in the direction of the hub axis. The upper edge of abutment portion 12 is defined by cam surfaces 22 inclined in an outward direction away from that axis.

Figure 3:
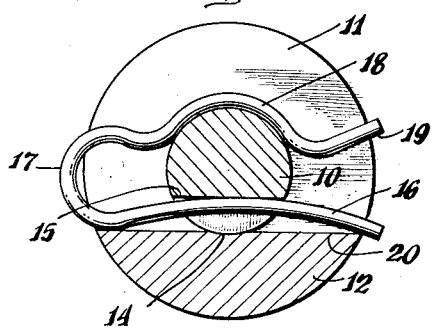
Fig. 3 is also a transverse sectional view taken along the line 3—3 in the direction of the arrows as indicated in Fig. 1.
Figure 4:
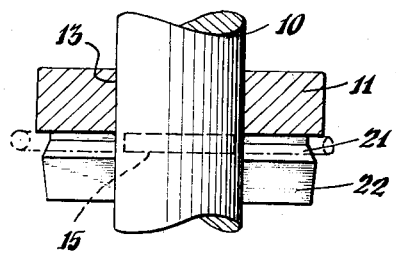
Fig. 4 is a sectional plan view through the hub and showing the latter mounted upon the shaft.
Figure 5:
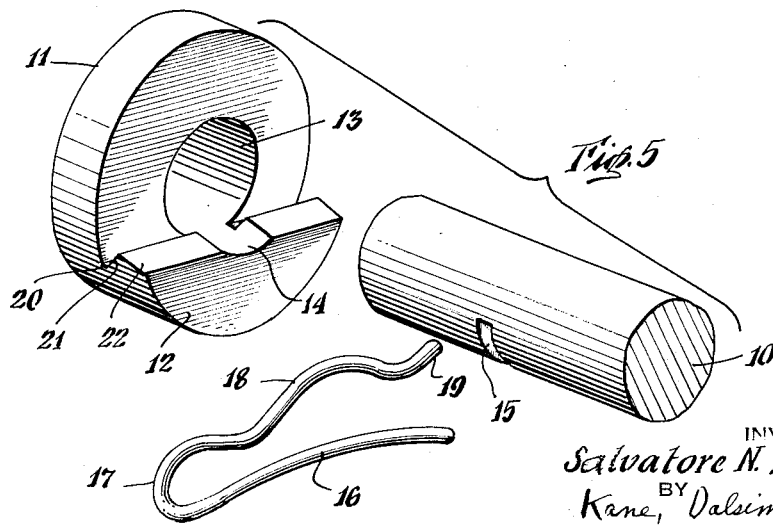
Fig. 5 is an exploded perspective view of the parts involved in the coupling as illustrated in the preceding figures.

Assuming that a hub is to be mounted on the shaft, the arm 16 of the clip is inserted into slot 15 as shown especially in Figs. 1 and 3. Under these circumstances, the bowed portion 18 of this detent will yieldingly engage against the shaft surface opposite slot 15. Therefore, it will be secured against detachment. The hub now receives within its bore 13 the shaft 10 and is moved with its abutment portion 12 facing in a forward direction towards the clip. As it is so moved, the end zones of arm 16 will ride in engagement with the cam surfaces 22 to flex that arm so that it overrides the zone of juncture of those surfaces and the side wall 21 of the groove 20.

In moving into that groove, arm 16 will move away from the second arm of the clip and will ride over the groove surfaces 21. Due to the resiliency of the long bowed portion incorporated in arm 16, it follows that the opposed wall effect area of bore 13 is maintained in contact with the shaft in a zone opposite the slot 15. Accordingly, no rocking will occur in the case of one part with respect to the other. Because of the inclined wall or surface 21, any tendency towards axial movement is prevented. Additionally, the bowed arm 16 will be held in rectangular relationship or perpendicular to the axis because of the smaller bow 18 embracing the outside of the shaft.

Thus, it is apparent that a quick detachable locking means is provided which will not require the use of skill or tools in securing the hub to the shaft. Also, when desired, a detachment of the parts may be achieved by simply withdrawing the clip from slot 15 and groove 20. Attachment as well as detachment of the hub may occur even within the casing of a control. It is apparent that this structure will not cause a marring or scarring of the shaft such as occurs where set screws are employed. Also, it will maintain the relationship of the shaft and hub both radially and axially without lost motion, even under conditions of vibration.

The same results are achieved by the coupling structure illustrated in Figs. 6 to 9 inclusive. Referring to the first three of these figures, the numeral 23 indicates the operating shaft, corresponding to shaft 10 in the earlier views. At a predetermined zone in this shaft, recesses are formed. These should preferbly be less than 180° apart, but not less than 90°, and occupy the same plane. As shown, each of these recesses embraces an outer guiding depression 24 extending axiallly of the shaft and centrally disposed cavity 25'.

The hub in these figures embraces a main body portion 25 in the form of a collar having a bore of a diameter such that this collar may be slid over the surface of shaft 23. The body is formed with radially-extending openings 26 spaced from each other in a manner such that they align with the cavities 25'. A flange portion 27 may define the forward end of body 25. Beyond this, an extension 28 is preferably integral with the collar. At the rear zone of body 25, a similar extension 29 is provided.

Detents, preferably in the form of spheres 30, are disposed one within each of the openings 26. The base portion of each of openings 26 is constricted as indicated at 32. The diameter of these openings is adequate to slidably accommodate the spheres or balls 30. However, the constriction 32 will in each instance prevent too great an inward movement of these elements. A resilient member, preferably taking the form of a C-ring 31, bears against the outer zones of each of the detents and forces them inwardly. Therefore, they normally extend inwardly of collar 25.

As will be understood, with the parts thus formed, they may be assembled by simply passing shaft 23 into the bore of the collar. The forward end of the shaft may be reduced or beveled, as shown, to provide a cam surface. Therefore, when this end reaches a point adjacent the detents, it will cam against their surfaces and force them outwardly against the resistance offered by the spring 31. Under continued projection of the shaft into the bore of the collar, the detents will move into the depressions 24 which will, in turn, guide them to seat against the edges defining the outer end of the cavities 25'. Under those circumstances, the spring or equivalent resilient element 31 will force the detents to remain in this seated position. So disposed they will provide an interlocking structure of a quick detachable nature and requiring no special tools for either securing or detaching the hub with respect to the shaft. The hub will be held against any movements with respect to the shaft even under extremes of vibration and cannot be displaced except by a force greater than might occur during normal operating conditions.

Referring to Fig. 9, in which a coupling has been shown as applied to a potentiometer or similar control, the numeral 33 indicates the body of a control preferably formed of insulating material and mounting a bushing 34 within which shaft 23 is rotatably supported. That shaft mounts, adjacent its outer end, the collar 27 as afore described. Beyond this collar, a mounting plate 35 of insulating material is disposed. The plate may mount any suitable number of contacts or contact arms 36 extending from a ring-shaped body. A bridging strip 37 is connected to that body and may be continued in the form of a contact ring which is electrically connected to a base ring 38. Conveniently, a disc 39 of insulating material encircles the body portion 25 of the hub. A resistance 40 is mounted within the control. This is engaged by the contact portion of arm 36 in the usual manner as shaft 23 is rotated.

Thus among others, the several objects of the invention as specifically aforenoted are achieved. Obviously numerous changes in construction and rearrangements of the parts might be resorted to without departing from the spirit of the invention as defined by the claim.

I claim:

A structure for attaching a hub to a shaft in an electrical control including in combination a hub in the form of a circular disc, a cylindrical shaft, a bore formed in said hub to receive said shaft, an abutment projecting from said hub and extending throughout a substantially arcuate segment of the hub, a surface of said abutment adjacent said shaft, a transverse slot formed in said abutment adjacent said hub and defined by opposed surfaces of said abutment and said hub, said bore being continued throughout the abutment in the form of an axial groove, a transverse groove in said shaft overlying said slot, a resilient member, an arcuate portion of said resilient member adjacent said shaft on the side thereof away from said transverse groove, and yieldingly urged against said shaft, a remaining portion of said resilient member disposed within said transverse groove and yieldingly urged against said shaft and a second remaining portion of said resilient member yieldingly urged within said slot whereby the hub, shaft and resilient member are yieldingly maintained against relative movement, said transverse slot in said hub extending beyond the middle of the bore and the side face of said transverse slot away from the hub forming a surface inclined downwardly toward the hub and a surface contiguous thereto forming a cam surface inclined downwardly in a direction away from said hub.

References Cited in the file of this patent

UNITED STATES PATENTS

| | | |
|---|---|---|
| 1,630,367 | Woodbridge | May 31, 1927 |
| 1,774,347 | Bainton | Aug. 26, 1930 |
| 1,782,196 | Dalton | Nov. 18, 1930 |
| 2,135,323 | Brantingson | Nov. 1, 1938 |
| 2,226,098 | Hedstrom | Dec. 24, 1940 |
| 2,512,690 | Smith et al. | June 27, 1950 |
| 2,589,482 | Downey | Mar. 18, 1952 |
| 2,636,362 | Dunn | Apr. 28, 1953 |
| 2,740,025 | Polye et al. | Mar. 27, 1956 |

FOREIGN PATENTS

| | | |
|---|---|---|
| 197,421 | Great Britain | May 16, 1923 |
| 1,001,910 | France | Oct. 31, 1951 |